United States Patent
Kato et al.

(10) Patent No.: US 9,286,669 B2
(45) Date of Patent: Mar. 15, 2016

(54) IMAGE PROCESSING APPARATUS, IMAGE PROCESSING METHOD AND PROGRAM

(71) Applicant: OMRON Corporation, Kyoto-shi, Kyoto (JP)

(72) Inventors: Yutaka Kato, Kyotanabe (JP); Yutaka Kiuchi, Soraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/244,034

(22) Filed: Apr. 3, 2014

(65) Prior Publication Data

US 2014/0301648 A1    Oct. 9, 2014

(30) Foreign Application Priority Data

Apr. 5, 2013 (JP) .................................. 2013-079975

(51) Int. Cl.
*G06K 9/48* (2006.01)
*G06T 7/00* (2006.01)
*G06K 9/62* (2006.01)

(52) U.S. Cl.
CPC .............. *G06T 7/001* (2013.01); *G06K 9/6206* (2013.01); *G06K 9/6255* (2013.01); *G06T 7/0032* (2013.01); *G06T 2207/20044* (2013.01); *G06T 2207/30164* (2013.01)

(58) Field of Classification Search
CPC ................... G06T 7/0085; G06T 7/001; G06T 2207/20192; G06T 2207/20182; G06K 9/6212

USPC .................................................. 382/199, 168
See application file for complete search history.

(56) References Cited

U.S. PATENT DOCUMENTS

| | | | |
|---|---|---|---|
| 6,868,175 B1 | 3/2005 | Yamamoto et al. | |
| 2006/0221417 A1* | 10/2006 | Fujieda et al. | 358/538 |
| 2011/0222766 A1* | 9/2011 | Kato et al. | 382/168 |
| 2013/0076865 A1 | 3/2013 | Tateno et al. | |

FOREIGN PATENT DOCUMENTS

JP    2002-230549 A    8/2002

* cited by examiner

*Primary Examiner* — Ruiping Li
(74) *Attorney, Agent, or Firm* — MOTS Law, PLLC

(57) ABSTRACT

A model is defined by a plurality of first positions on an edge extracted from a model image and a changing direction of the edge in each of the first positions. An image processing apparatus calculates a changing direction of an edge in a second position of an input image corresponding to the first position on the edge of the model image. The image processing apparatus accepts an instruction associated with a permissible value of the changing direction of the edge. The image processing apparatus calculates a similarity degree of the first position and the second position corresponding to the first position based on the accepted instruction, the changing direction of the edge in the first and second position. The image processing apparatus determines whether a specific area in the input image is similar to the model or not based on the calculated similarity degree in the second positions.

11 Claims, 17 Drawing Sheets

A

B

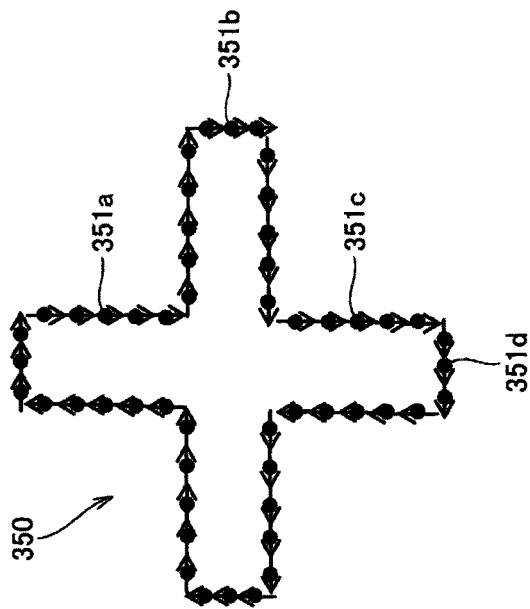
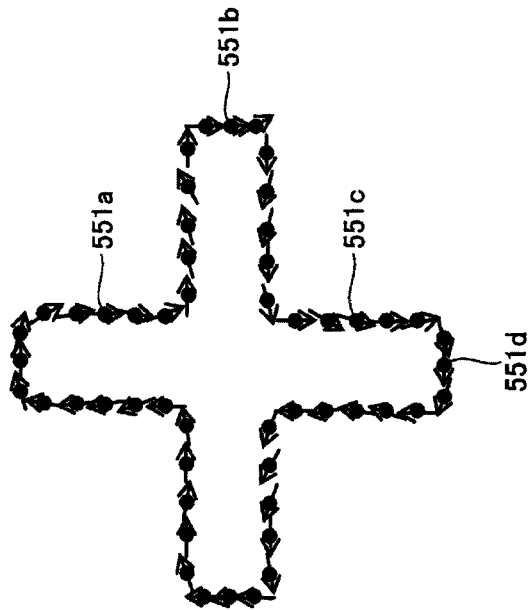
FIG. 8B
FIG. 8A

FIG. 9

| Deformation permission level \ Angular difference | Equal to or greater than 0° and smaller than 10° | Equal to or greater than 10° and smaller than 20° | Equal to or greater than 20° and smaller than 30° | Equal to or greater than 30° and smaller than 40° | Equal to or greater than 40° and smaller than 60° | Equal to or greater than 60° | |
|---|---|---|---|---|---|---|---|
| High | 100 | 90 | 50 | 30 | 15 | 0 | D91 ⎫ |
| Middle | 100 | 70 | 40 | 20 | 10 | 0 | D92 ⎬ D9 |
| Low | 100 | 60 | 30 | 5 | 0 | 0 | D93 ⎭ |

(x1, y1, Ec1)
(x2, y2, Ec2)
⋮
(xn, yn, Ecn)

IMAGE PROCESSING APPARATUS, IMAGE PROCESSING METHOD AND PROGRAM

BACKGROUND

1. Field

The present invention relates to an image processing apparatus, an image processing method and a program which search a similar area to a previously registered model from an input image.

2. Related Art

In the FA (Factory Automation) field or the like, conventionally, search processing (hereinafter referred to as "pattern matching) based on a previously registered pattern (hereinafter referred to as a "model") is used for an input image obtained by capturing an image of a measuring target (hereinafter referred to as a "workpiece"). By the pattern matching, it is possible to detect a defect such as scratch or refuse which appears on the workpiece or to search an area on the workpiece which is similar to the model.

As a technique for the pattern matching, it is known that a portion (which will be hereinafter referred to as an "edge (part)") having change in a gray level value (brightness) in an input image is extracted and pattern matching is carried out based on a value indicative of a direction of the change in the edge (hereinafter referred to as an "edge code" or "EC (Edge Code)"). For example, see Japanese Laid-Open Patent Publication No. 2002-230549.

Moreover, the Japanese Laid-Open Patent Publication No. 2002-230549 discloses pattern matching to be performed through threshold processing based on a score accumulative value. In the pattern matching, specifically, a score indicative of a matching degree of an edge code between each pixel and a corresponding pixel in model data is calculated on a pixel unit and a value obtained by accumulating them is set to be a similarity degree. The model data is scanned in an input image while a maximum value of the similarity degree is obtained. It is determined whether a matched area with the model is present in the input image or not according to whether the maximum value exceeds a prescribed threshold or not.

By using the edge code, it is possible to accurately search the matched area with the model regardless of an influence in pickup of the input image (for example, reflection of a shadow or illumination unevenness).

In addition, a matching degree of a model and an entire measuring target is conventionally calculated based on a search result of an area matched with the model. Moreover, quality of the measuring target is determined based on the calculated matching degree and a predetermined threshold.

There are needs to permit local shape deformation of the measuring target. However, in order to meet the above needs, decreasing the threshold of the similarity degree (the score accumulative value) to meet the above needs increases risk of erroneous permission of a mismatched shape with the model.

SUMMARY

In consideration of the problems, it is an object of the present invention to provide an image processing apparatus, an image processing method and a program which can permit local shape deformation of a measuring target in pattern matching using a shape feature of the measuring target.

In accordance with an aspect of the present invention, an image processing apparatus searches a similar area to a previously registered model from an input image. The model is defined by a plurality of first positions on an edge extracted from a model image and a changing direction of the edge in each of the first positions. The image processing apparatus includes a first calculator configured to calculate a changing direction of an edge in a second position of the input image corresponding to the first position, an acceptor configured to accept an instruction associated with a permissible value of the changing direction of the edge, a second calculator configured to calculate a similarity degree of the first position and the second position corresponding to the first position based on the accepted instruction, the changing direction of the edge in the first position and the changing direction of the edge in the second position, and a first determining unit configured to determine whether a specific area in the input image is similar to the model or not based on the calculated similarity degree in the second positions.

In the image processing apparatus, it is preferable that the acceptor should accept, as the instruction, an instruction for designating any of data with which information representing a difference between changing directions of two edges and a similarity degree of the two edges are associated.

It is preferable that the image processing apparatus should further include a storage unit configured to prestore the data.

It is preferable that an angular difference between changing directions of two edges and the similarity degree should be associated with each of the data in such a manner that a matching degree of the two edges is reduced when the angular difference is increased. The association of the similarity degree with the angular difference is different between the data from each other. The image processing apparatus further includes a third calculator configured to calculate, every second position, an angular difference between a changing direction of an edge in the first position and a changing direction of an edge in the second position corresponding to the first position. The second calculator calculates the similarity degree of the first position and the second position corresponding to the first position based on the designated data and the calculated angular difference.

It is preferable that the image processing apparatus should further include a second determining unit configured to determine, every first position, whether the second position corresponding to the first position belongs to the edge area of the input image or not. The first calculator calculates a changing direction of an edge in the second position corresponding to the first position when the second determining unit determines that the second position belongs to the edge area.

It is preferable that the image processing apparatus should further include a third determining unit configured to determine whether the first position and the second position are similar to each other or not based on the similarity degree of the first position and the second position corresponding to the first position, and a display controller configured to display, on a display, the second position which is similar to the first position and the second position which is not similar to the first position in different display modes from each other corresponding to the input image.

It is preferable that the image processing apparatus should further include a second determining unit configured to determine, every first position, whether the second position corresponding to the first position belongs to the edge area of the input image or not, and a display controller configured to display, on a display, the second position which belongs to the edge area of the input image and the second position which does not belong to the edge area of the input image in different display modes from each other corresponding to the input image.

It is preferable that the display mode should be a color.

It is preferable that the first position should be obtained by sampling a point on an edge of the model image.

In accordance with another aspect of the present invention, an image processing method is used for searching a similar area to a previously registered model from an input image. The model is defined by a plurality of first positions on an edge extracted from a model image and a changing direction of the edge in each of the first positions.

The image processing method includes the steps of calculating a changing direction of an edge in a second position of the input image corresponding to the first position, accepting an instruction associated with a permissible value of the changing direction of the edge, calculating a similarity degree of the first position and the second position corresponding to the first position based on the accepted instruction, the changing direction of the edge in the first position and the changing direction of the edge in the second position, and determining whether a specific area in the input image is similar to the model or not based on the similarity degree calculated in the second positions.

In accordance with a further aspect of the present invention, a program controls an image processing apparatus configured to search a similar area to a previously registered model from an input image. The model is defined by a plurality of first positions on an edge extracted from a model image and a changing direction of the edge in each of the first positions. The program causes a processor of the image processing apparatus to execute the steps of calculating a changing direction of an edge in a second position of the input image corresponding to the first position, accepting an instruction associated with a permissible value of the changing direction of the edge, calculating a similarity degree of the first position and the second position corresponding to the first position based on the accepted instruction, the changing direction of the edge in the first position and the changing direction of the edge in the second position, and determining whether a specific area in the input image is similar to the model or not based on the similarity degree calculated in the second positions.

According to the present invention, it is possible to permit local shape deformation of a measuring target in pattern matching using a shape feature of the measuring target.

BRIEF DESCRIPTION OF THE DRAWINGS

FIGS. 8A and 8B are views for explaining a sampling point, a corresponding point, an edge changing method and an angular difference;

FIG. 9 is a table representing data to be utilized in calculation of a matching degree by a CPU;

DETAILED DESCRIPTION

Figure 1:
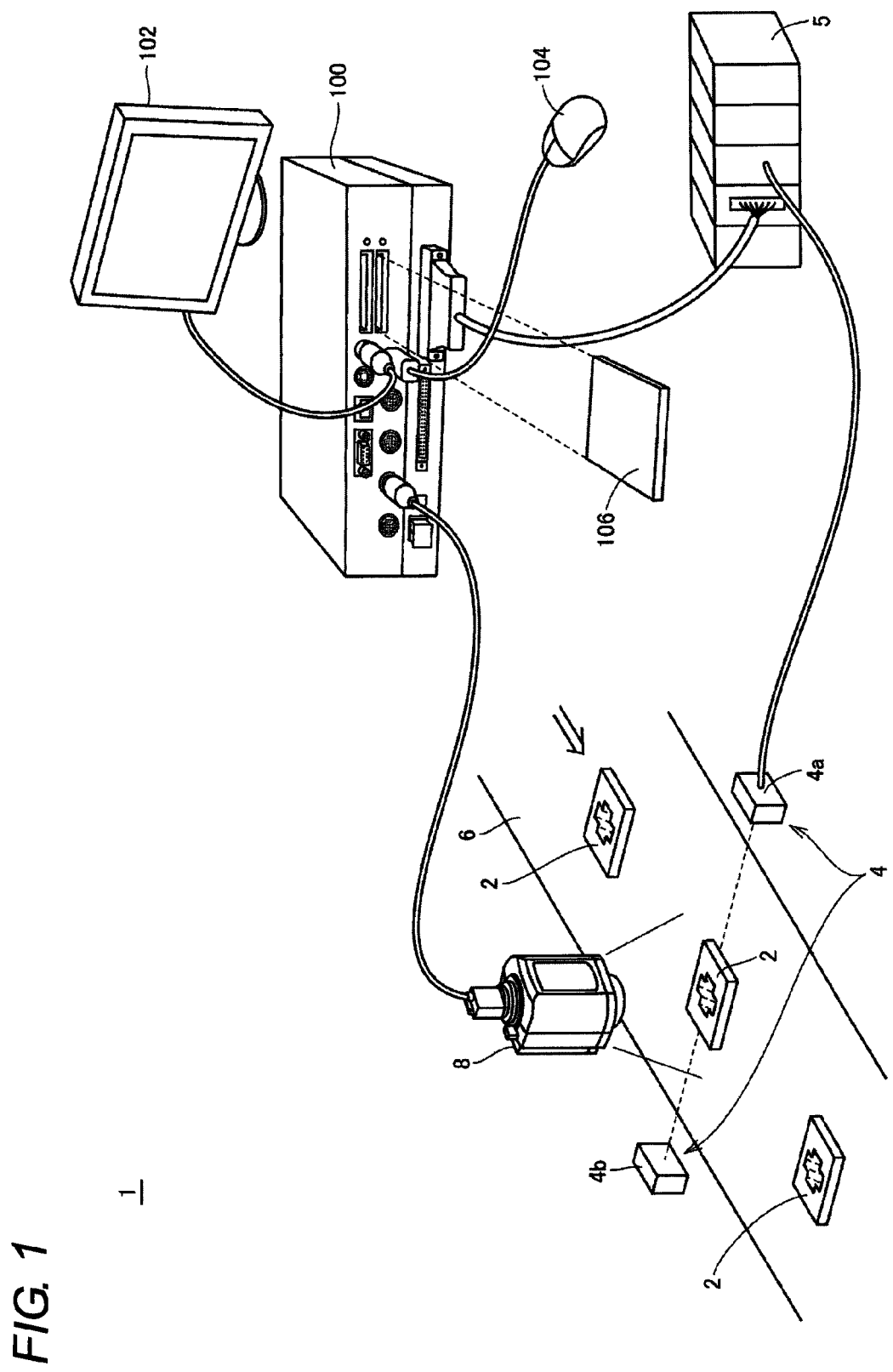
FIG. 1 is a schematic view showing an entire structure of a vision sensor system including an image processing apparatus.

An embodiment according to the present invention will be described in detail with reference to the drawings. The same or corresponding portions in the drawings have the same reference numerals and description thereof will not be repeated.

<A. System Configuration>

FIG. 1 is a schematic view showing an entire structure of vision sensor system 1 including image processing apparatus 100 according to an embodiment of the present invention.

With reference to FIG. 1, vision sensor system 1 is incorporated into a production line or the like and executes pattern matching on workpiece 2 by using a previously registered model (an "edge code image" is used as will be described below).

In vision sensor system 1, workpiece 2 is delivered by delivering mechanism 6 such as a belt conveyer and an image of delivered workpiece 2 is captured by image capturing device 8 at predetermined timing.

As an example, image capturing device 8 includes an image pickup element partitioned into a plurality of pixels, for example, a CCD (Coupled Charged Device) and a CMOS (Complementary Metal Oxide Semiconductor) sensor in addition to an optical system such as a lens. It is also possible to further provide an illumination mechanism. The illumination mechanism is configured to irradiate, with light, workpiece 2 of which image is captured by image capturing device 8.

An image (hereinafter referred to as an "input image") obtained by pickup of image capturing device 8 is transmitted to image processing apparatus 100. Image processing apparatus 100 executes the pattern matching over the input image received from image capturing device 8 and displays a result on display 102 which is connected or outputs the result to an external device.

Arrival of workpiece 2 in a visual field of image capturing device 8 is detected by photoelectric sensor 4 disposed on both ends of delivering mechanism 6. Specifically, photoelectric sensor 4 includes light receiving unit 4a and projecting unit 4b which are disposed on the same optical axis, and light receiving unit 4a detects that light emitted from projecting unit 4b is shielded by workpiece 2 so that the arrival of workpiece 2 is detected. A trigger signal of photoelectric sensor 4 is output to PLC (Programmable Logic Controller) 5.

PLC 5 receives the trigger signal from photoelectric sensor 4 or the like, and furthermore, manages control itself of delivering mechanism 6.

Image processing apparatus 100 has a measuring mode for executing various image processing over workpiece 2 and a setting mode for carrying out model registration processing or the like which will be described below. These modes are switched through manipulation of mouse 104 or the like by a user.

Image processing apparatus 100 is typically a computer having a general-purpose architecture and executes a program (an instruction code) installed previously, thereby offering various functions which will be described below. The program typically is distributed in a storage state in memory card 106 or the like.

When the general-purpose computer is utilized, an OS (Operating System) for offering a basic function of the computer may be installed in addition to an application for offering functions according to the present embodiment. In this case, the program may call a necessary one of program modules offered as a part of the OS in a predetermined array in predetermined timing and cause the same module to execute the processing. In other words, the program itself does not include the module but the processing may be executed in cooperation with the OS. The program may have such a configuration as not to include a part of the modules.

Furthermore, the program may be incorporated into a part of other programs. Also in that case, the program itself does not have the modules included in the other programs which are to be combined as described above, and the processing is executed in cooperation with the other programs. In other words, the program may have such a configuration as to be incorporated in the other programs. A part or all of the functions offered by the execution of the program may be mounted as a dedicated hardware circuit.

Figure 2:
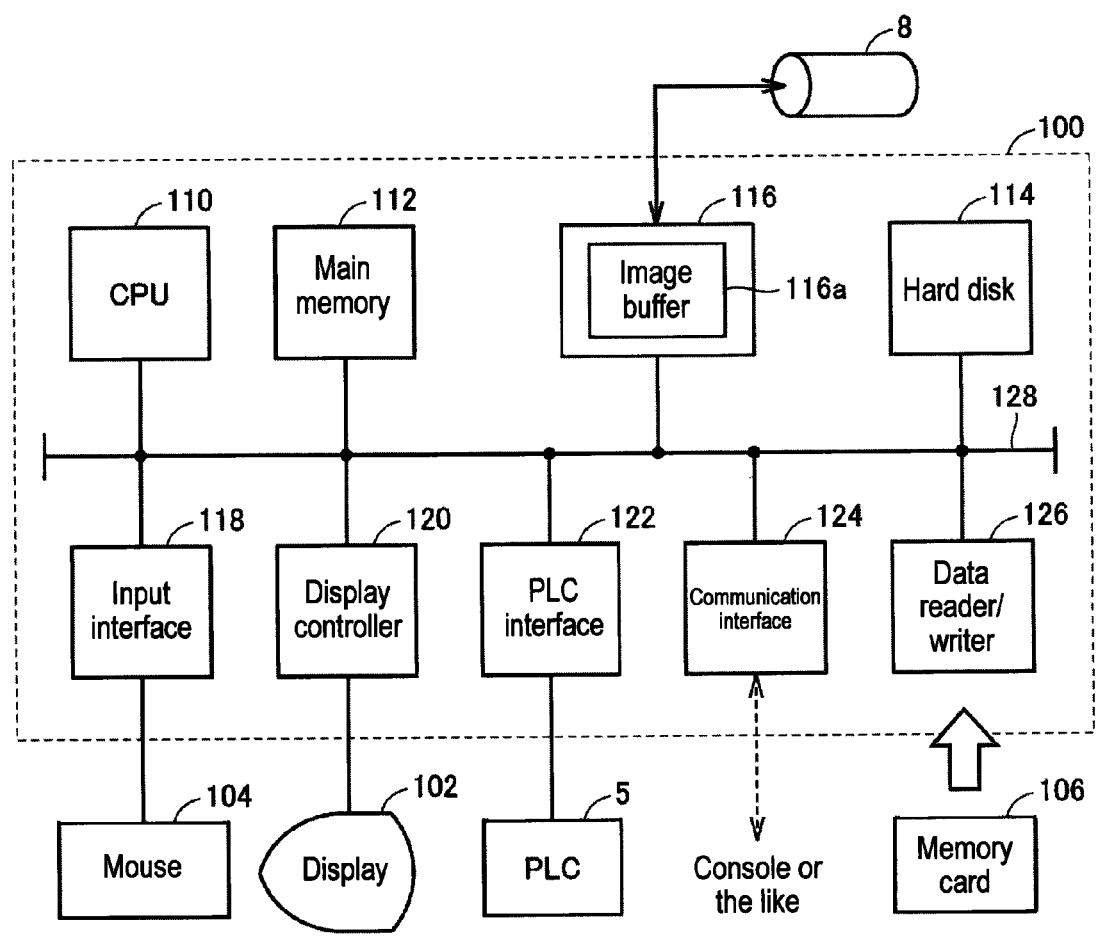
FIG. 2 is a diagram showing a schematic structure of the image processing apparatus.

FIG. 2 is a diagram showing a schematic structure of image processing apparatus 100 according to the embodiment of the present invention. With reference to FIG. 2, image processing apparatus 100 includes CPU (Central Processing Unit) 110 serving as an arithmetic processing unit, main memory 112 and hard disk 114 which serve as storage units, camera interface 116, input interface 118, display controller 120, PLC interface 122, communication interface 124, and data reader/writer 126. These units are connected to each other in order to enable data communication through bus 128.

CPU 110 expands the programs (codes) stored in hard disk 114 into main memory 112 and executes them in predetermined order, thereby performing various calculations. Main memory 112 is typically a volatile storage device such as a DRAM (Dynamic Random Access Memory) and holds image data acquired by image capturing device 8, work data, information about a model and the like in addition to the program read from hard disk 114. Furthermore, hard disk 114 may store various set values and the like. A semiconductor storage device such as a flash memory may be employed in addition to or in place of hard disk 114, Camera interface 116 mediates data transmission between CPU 110 and image capturing device 8. In other words, camera interface 116 is connected to image capturing device 8 configured to capture an image of workpiece 2, thereby generating image data. More specifically, camera interface 116 can be connected to at least one image capturing device 8 and includes image buffer 116*a* configured to temporarily store image data acquired from image capturing device 8. When image data having a predetermined number of frames is stored in image buffer 116*a*, camera interface 116 transfers the stored data to main memory 112. Moreover, camera interface 116 gives an image pickup command to image capturing device 8 in accordance with an internal command generated by CPU 110.

Input interface 118 mediates data transmission between CPU 110 and an input unit such as mouse 104, a keyboard or a touch panel. In other words, input interface 118 accepts a manipulation command given through manipulation of the input unit by a user.

Display controller 120 is connected to display 102 according to a typical example of a display device and gives the user a notice of a result of image processing in CPU 110 or the like. In other words, display controller 120 is connected to display 102 and controls display in display 102.

PLC interface 122 mediates data transmission between CPU 110 and PLC 5. More specifically, PLC interface 122 transmits, to CPU 110, information about a state of a production line to be controlled by PLC 5, information about a workpiece and the like.

Communication interface 124 mediates data transmission between CPU 110 and a console (or a personal computer or a server device) or the like. Communication interface 124 typically includes Ethernet (registered trademark), USB (Universal Serial Bus) and the like. As will be described below, a program downloaded from a distribution server or the like may be installed into image processing apparatus 100 through communication interface 124 in place of the configuration in which the program stored in memory card 106 is installed into image processing apparatus 100.

Data reader/writer 126 mediates data transmission between CPU 110 and memory card 106 to be a recording medium. In other words, a program to be executed by image processing apparatus 100 or the like circulates to memory card 106 in a storing state, and data reader/writer 126 reads the program from memory card 106. Moreover, data reader/writer 126 writes the image data acquired by image capturing device 8 and/or a processing result in image processing apparatus 100 to memory card 106 in response to an internal command of CPU 110. Memory card 106 is configured from a general-purpose semiconductor storage device such as a CF (Compact Flash) or an SD (Secure Digital), a magnetic storage medium such as a flexible disk (Flexible Disk), an optical storage medium such as a CD-ROM (Compact Disk Read Only Memory) or the like.

Moreover, another output device such as a printer may be connected to image processing apparatus 100 if necessary.

<B. Model Registration Processing>

Figure 3:
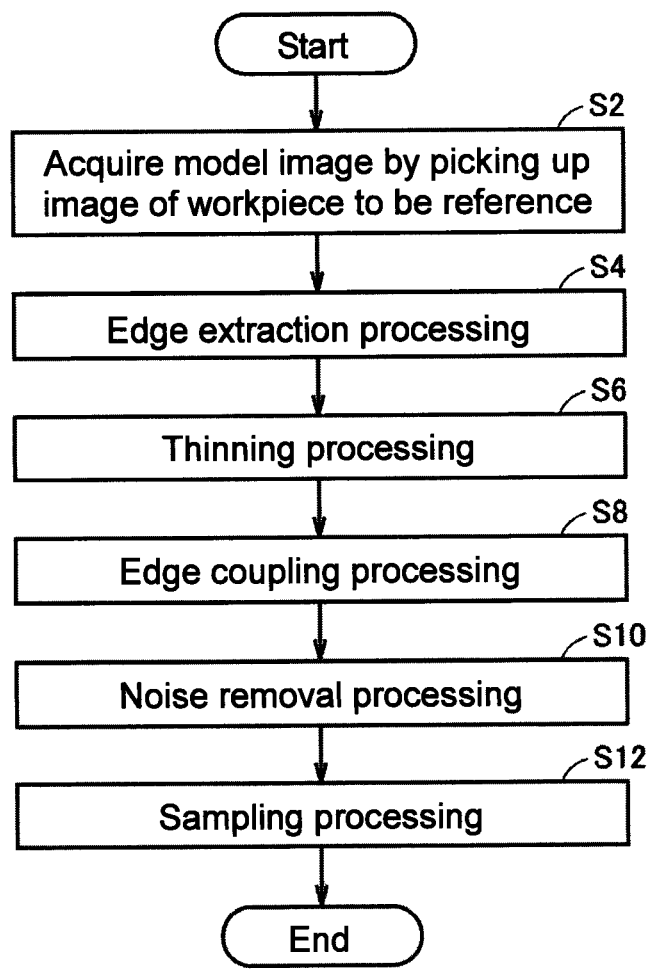
FIG. 3 is a flowchart for explaining a flow of processing in model registration processing.

FIG. 3 is a flowchart of model registration processing.

In other words, FIG. 3 is a flowchart illustrating a flow for generating a model.

With reference to FIG. 3, in step S2, CPU 110 of image processing apparatus 100 acquires a model image obtained by capturing an image of workpiece 2 to be a reference through image capturing device 8. In step S4, CPU 110 extracts an edge from the model image and generates an edge extraction image. In other words, CPU 110 calculates an edge intensity by known filter processing over all of pixels of the model image and extracts, as an edge point, a pixel having the edge intensity exceeding a predetermined threshold. Moreover, CPU 110 calculates an edge code indicative of a changing direction of an edge with respect to all of extracted edge points by the method described in the Japanese Laid-Open Patent Publication No. 2002-230549.

Figures 19A, 19B:
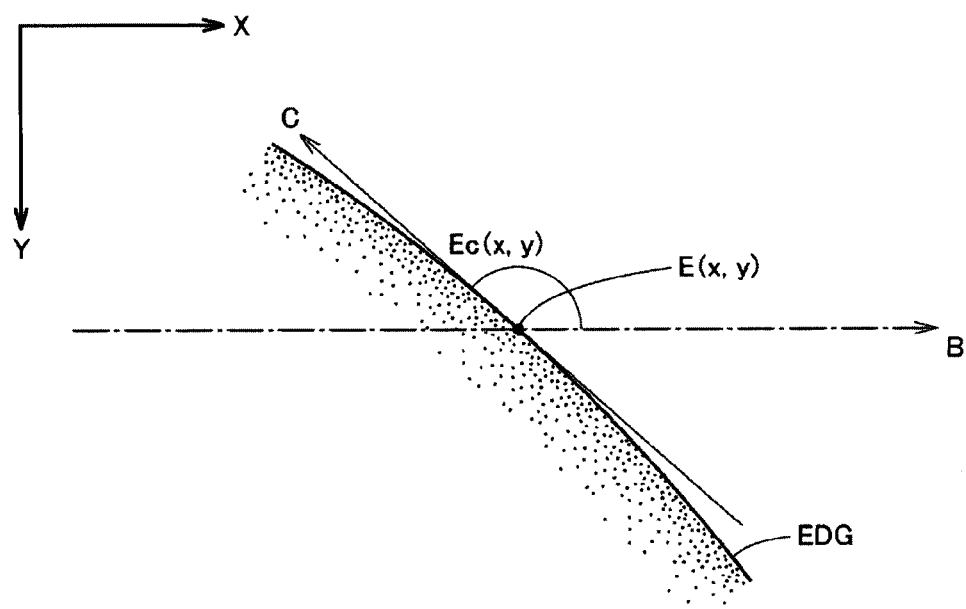
FIGS. 19A and 19B are charts for explaining processing for calculating an edge code and an edge code image.

In the present embodiment, a tangential direction of the edge is calculated as the edge code (an edge direction/an edge angle) according to an example of a value indicative of the changing direction of the edge. FIGS. 19A and 19B are charts of the processing for calculating an edge code and an edge code image. In particular, FIG. 19A shows a method of calculating an edge code on each edge point and FIG. 19B shows an example of a data structure of the edge code image.

There is supposed the case in which an image shown in FIG. 19A is scanned in a B direction and is thus subjected to edge extraction processing. In the edge extraction processing, an edge intensity is detected based on a gray level value of the pixel and gray level values of peripheral pixels thereof for the respective pixels present in the B direction, and a maximum value in a profile of the edge intensity in the B direction is extracted as an edge.

According to an example shown in FIG. 19A, an edge point having a coordinate position E (x, y) is extracted as a part of edge EDG. Based on gray level values of peripheral pixels of extracted coordinate position E (x, y), it is determined which direction edge EDG is continuously provided. An outline will be described. Tangent vector C on an edge point in coordinate position E (x, y) configuring edge EDG is calculated. Angle Ec (x, y) formed by tangent vector C and a reference vector (the B direction in the example shown in FIG. 19A) is calculated as the edge code. Referring to angle Ec (x, y), 0° to 360° (or −180° to 180°) may be defined as an effective range or 0° to 180° may be defined as the effective range. In the latter case, an absolute value of an angular difference between tangent vector C and the reference vector is defined.

As an alternative method, a changing direction of gradation in the extracted edge may be calculated as the edge code. In this case, an orthogonal direction to tangent vector C shown in FIG. 19A serves as the edge code.

In step S6, CPU 110 thins the extracted edge and generates a thinned edge image. In detail, CPU 110 thins the edge extraction image in such a manner that only any of all the extracted edges having a higher intensity than the adjacent edges on both sides remains, thereby generating a thinned edge image.

In step S8, CPU 110 couples the edges subjected to the thinning processing. Specifically, CPU 110 couples any of the adjacent edges which has the angular difference having a certain value or smaller in the changing direction of the edge, thereby grouping the edges.

In step S10, CPU 110 carries out noise removal processing over the coupled edges, thereby generating an edge image subjected to noise removal. Specifically, CPU 110 removes any of the groups obtained by the coupling which has four constituting edges or less, thereby generating an edge image subjected to the noise removal.

In step S12, CPU 110 carries out sampling processing over the edge image subjected to the noise removal. Specifically, CPU 110 disposes model points at regular intervals over the groups which are not removed, thereby generating a model.

The generated model is defined by at least a plurality of positions on the extracted edge and the changing directions of the edges in the respective positions. As an example, the model is defined by at least a plurality of sampling points (sampling positions) obtained by sampling the points on the extracted edges at regular intervals and the changing directions of the edges on the respective sampling points. The generated model is stored in main memory 112.

Figure 4:
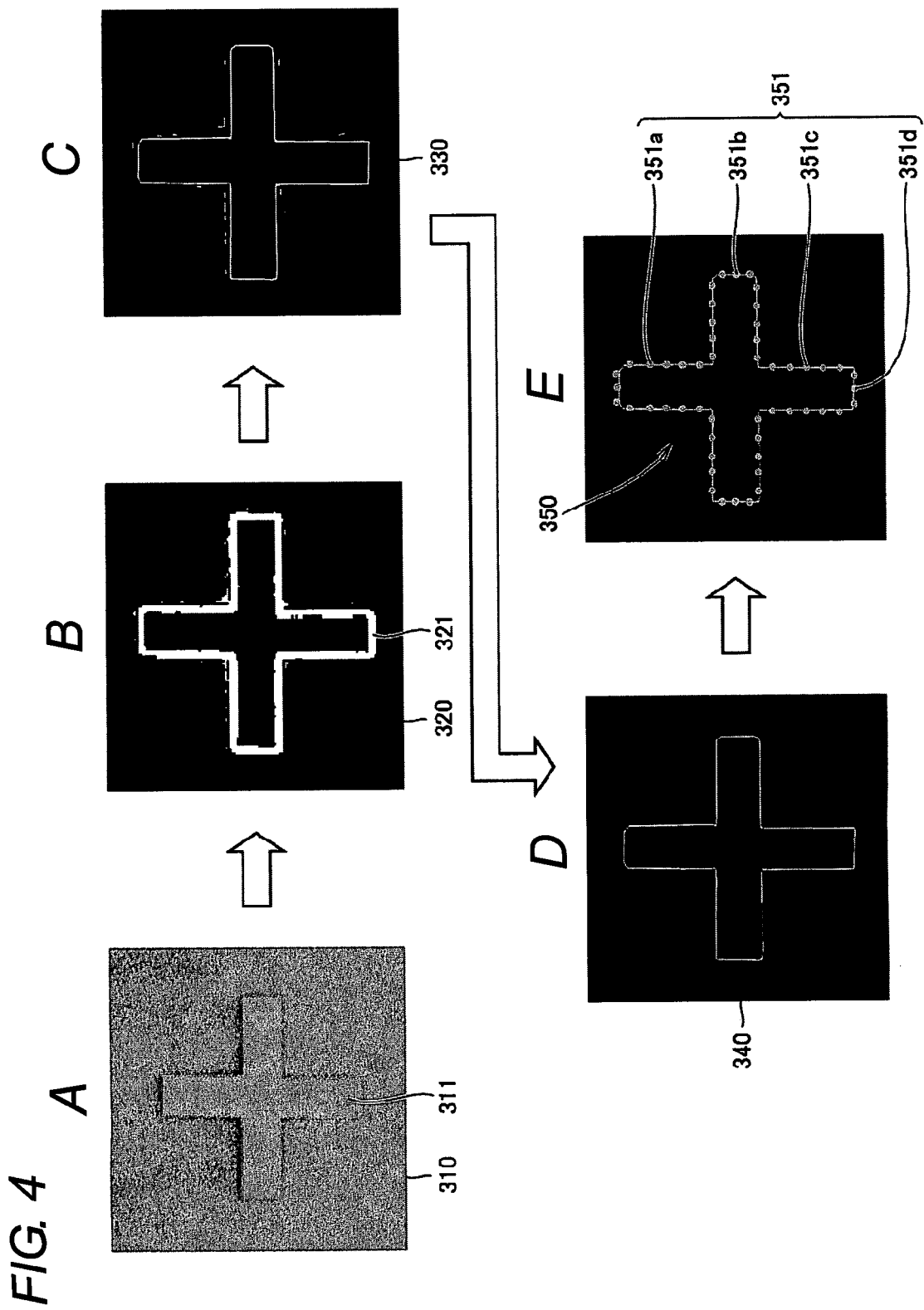
FIG. 4 is a view illustrating an image generated by each processing in the model registration processing.

FIG. 4 is a view illustrating an image generated by each processing in the model registration processing. Images A to E shown in FIG. 4 will be described below corresponding to respective steps in FIG. 3.

With reference to FIG. 4, image A represents model image 310 obtained by capturing an image of workpiece 2. In other words, image A represents an image obtained by the processing of step S2 in FIG. 3. Model image 310 includes area 311 corresponding to a cross-shaped mark drawn on the surface of workpiece 2. Image B is intended for explaining edge extraction image 320. In other words, image B represents an image obtained by the processing of step S4 in FIG. 3. Edge extraction image 320 includes edge area 321 to be a set of the edge points.

Image C represents thinned edge image 330. In other words, image C represents an image obtained after the execution of the processing in step S6 of FIG. 3. Image D is intended for explaining edge image 340 after the noise removal. In other words, image D represents an image obtained by the processing of step S10 in FIG. 3.

Image E is intended for explaining model 350 generated based on model image 310. In other words, image E schematically represents data obtained by the processing of step S12 in FIG. 3. Model 350 includes a plurality of sampling points 351. For convenience of the explanation, four of sampling points 351 are referred to as sampling points 351a, 351b, 351c and 351d, respectively.

<C. Measurement Processing>

In the pattern matching, a degree of similarity (a similarity degree) is calculated on a non-matching degree, a difference degree or a distance as well as a matching degree in some cases. The matching degree will be described below as an example of the similarity degree. The matching degree represents an extent of a difference between two targets to be compared.

Image processing apparatus 100 performs processing for specifying a matched area with a registered model in an image (an input image) of a workpiece to be a measuring target after ending the model registration processing.

(c1. Flow of Whole Processing)

Figure 5:
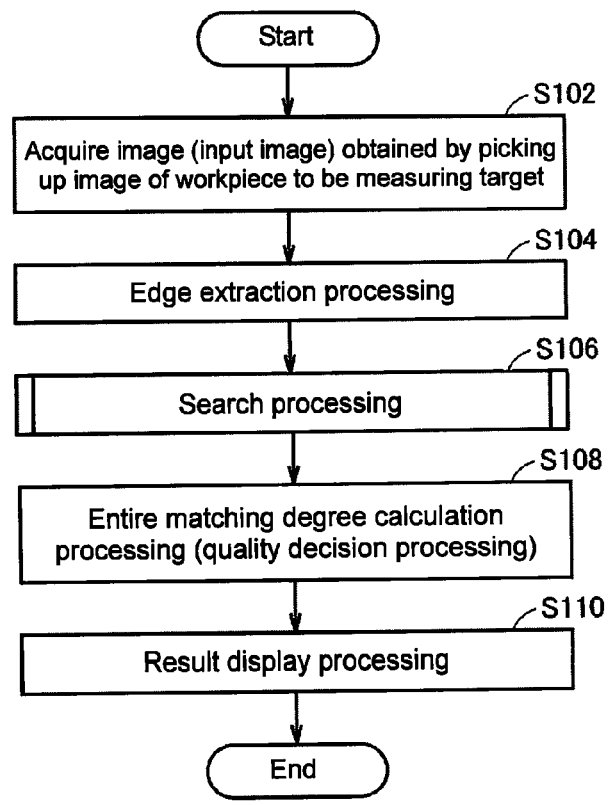
FIG. 5 is a flowchart for explaining a flow of entire measurement processing.

FIG. 5 is a flowchart of the measurement processing. With reference to FIG. 5, in step S102, CPU 110 acquires an image (an input image) obtained by capturing an image of a workpiece to be a measuring target through image capturing device 8. In step S104, CPU 110 extracts an edge from the input image and generates an edge extraction image. Moreover, an edge code on each edge point in the generated edge extraction image is calculated. In step S106, CPU 110 searches a matched area with a model from the input image, thereby specifying the matched area with the model in the input image.

Figure 7:
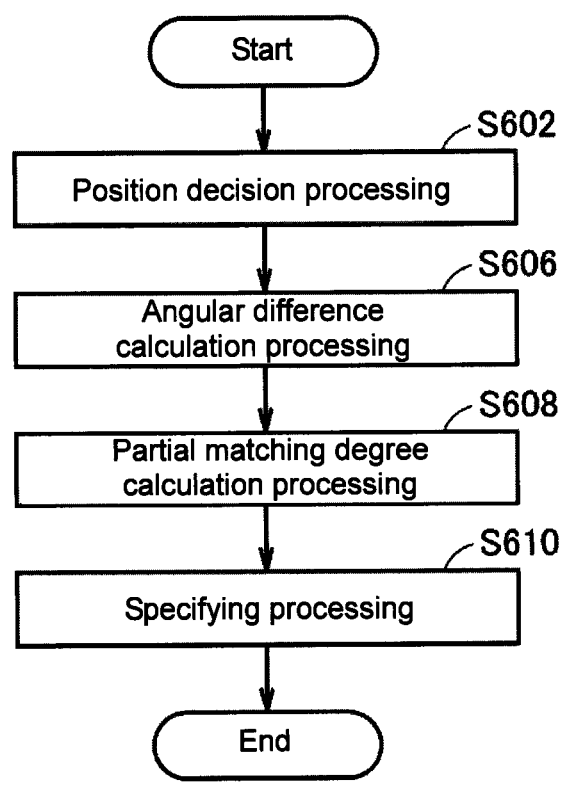
FIG. 7 is a flowchart for explaining a flow of processing in search processing in step S106 of FIG. 5.

In step S108, CPU 110 calculates the matching degree of the model with the input image based on a result of the search. In step S110, CPU 110 outputs the result based on the search processing to display 102. The details of the search processing in step S106 will be described below (FIG. 7).

The thinning processing and the noise removal processing are not performed for the input image obtained by capturing the image of workpiece 2 to be measured.

Figure 6:
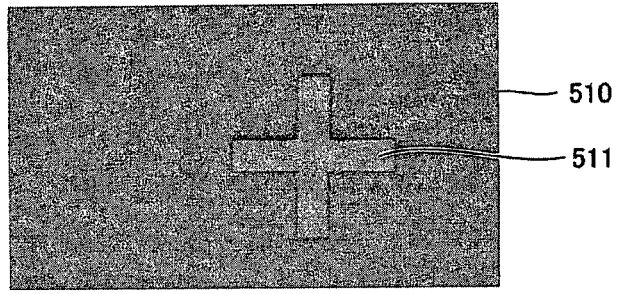
FIG. 6 is a view illustrating an image generated by processing in the measurement processing.
Figure 6:
Figure 6:
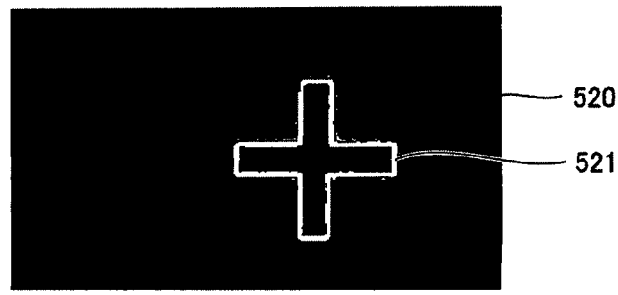

FIG. 6 is a view illustrating an image generated by the measurement processing. Respective images A to C shown in FIG. 6 will be described corresponding to steps in FIG. 5.

With reference to FIG. 6, image A represents input image 510 obtained by capturing the image of workpiece 2 to be measured. In other words, image A represents an image obtained by the processing of step S102 in FIG. 5. Input image 510 includes image 511 corresponding to a cross-shaped mark drawn on the surface of workpiece 2. Moreover, image B is intended for explaining edge extraction image 520 of workpiece 2 to be measured. In other words, image B represents an image obtained by the processing of step S104 in FIG. 5. Edge extraction image 520 includes edge area 521 to be a set of the edge points.

(c2. Search Processing)

FIG. 7 is a flowchart for explaining a flow of processing in the search processing in step S106 of FIG. 5. With reference to FIG. 7, in step S602, CPU 110 determines whether a corresponding point to sampling point 351 belongs to edge extraction area 521 extracted in input image 510 or not every sampling point 351. The corresponding point will be described below (FIG. 8).

In step S606, CPU 110 calculates, every corresponding point, an angular difference between an edge code on sampling point 351 and an edge code on a corresponding point on edge extraction image 520 to sampling point 351.

In step S608, CPU 110 calculates a matching degree (a partial matching degree) of sampling point 351 with the corresponding point to sampling point 351 based on previously selected data and the calculated angular difference. In step S610, CPU 110 specifies a matched portion with model 350 in input image 510 (accurately, edge extraction image 520) based on the calculated matching degree in corresponding points.

FIGS. 8A and 8B are views for explaining the sampling point, the corresponding point, the edge changing method and the angular difference. With reference to FIGS. 8A and 8B, FIG. 8A schematically illustrates model 350. As described above, model 350 is defined by at least sampling points 351 and the edge codes on the respective sampling points. Moreover, each arrow in FIG. 8A represents an edge code on each of the sampling points.

FIG. 8B is a view illustrating a corresponding point in edge area 521 on edge extraction image 520 and a changing direction of an edge on the corresponding point. Corresponding point 551a corresponds to sampling point 351a in sampling points 351. Similarly, corresponding point 551b corresponds to sampling point 351b. Corresponding point 551c corresponds to sampling point 351c. No edge point corresponds to sampling point 351d.

Moreover, each arrow in image B represents the changing direction of the edge on the corresponding point.

CPU 110 calculates an angular difference between the changing direction of the edge on sampling point 351 and the changing direction of the edge on the corresponding point to the sampling point as described above. As a specific example, CPU 110 calculates an angular difference between a changing direction of an edge on sampling point 351a and a changing direction of an edge on corresponding point 551a corresponding to sampling point 351a. CPU 110 calculates the angular difference for only sampling point 351 of which corresponding point belongs to an edge area.

FIG. 9 is a table showing data D9 to be utilized for calculating a matching degree by CPU 110. In other words, FIG. 9 is a table showing data to be utilized for partial matching degree calculation processing of step S608 in FIG. 7.

With reference to FIG. 9, in data D9, a score representing a matching degree of single sampling point 351 with a single corresponding point corresponds to each of three deformation permission levels (high, middle, low) and an angular difference (specifically, a range of the angular difference). In detail, data D9 includes a plurality of data D91, D92 and D93. Referring to each of data D91, D92 and D93, information indicative of a difference between changing directions of two edges is associated with a similarity degree of the two edges.

For example, referring to data D91 having the deformation permission level representing "high", the angular difference is associated with the matching degree in such a manner that the matching degree of the two edges is reduced if the angular difference between the changing directions of the two edges is increased.

Referring to data D92 having the deformation permission level representing "middle", the matching degree of the two edges is reduced if the angular difference in the changing directions of the two edges is increased, and furthermore, the association of the matching degree with the angular difference is different from data D91. In more detail, the score of data D92 is set to be smaller than that of data D91 within a plurality of ranges (which is equal to or greater than 10° and is smaller than 20°, is equal to or greater than 20° and is smaller than 30°, is equal to or greater than 30° and is smaller than 40°, and is equal to or greater than 40° and is smaller than 60°). In other words, data D92 represents that a permission degree with respect to local shape change of a target is more reduced than data D91.

Referring to data D93 having the deformation permission level representing "low", the matching degree of the two edges is reduced if the angular difference in the changing directions of the two edges is increased, and furthermore, the association of the matching degree with the angular difference is different from data D91 and D92. In more detail, the score of data D93 is set to be smaller than the scores of data D91 and D92 within a plurality of ranges (which is equal to or greater than 10° and is smaller than 20°, is equal to or greater than 20° and is smaller than 30°, is equal to or greater than 30° and is smaller than 40°, and is equal to or greater than 40° and is smaller than 60°). In other words, data D93 represents that the permission degree with respect to the local shape change of the target is more reduced than data D92.

Data D9 shown in FIG. 9 is only illustrative and a data format and the value of the score indicative of the matching degree are not restricted thereto. For example, it is also possible to employ a structure in which the score corresponding to the angular difference is not prestored as in data D9 but an input of a threshold of the angular difference is accepted and the matching degree of the entire measuring target is incremented with the score set to be one only when the angular difference between the measured edge code and the edge code of the model is smaller than the threshold.

Moreover, image processing apparatus 100 may be configured to generate data D9 (D91, D92, D93) by using a predetermined calculation equation. In this case, it is sufficient that image processing apparatus 100 prestores the calculation equation in place of data D9.

Furthermore, CPU 110 of image processing apparatus 100 reads one of data D91, D92 and D93 based on an instruction given from a user and utilizes the read data in the following calculation for two matching degrees.

(I) Matching Degree of Changing Direction of Edge

CPU 110 treats sampling point 351 having threshold Th1 (for example, a score=50) or more and the corresponding point to the sampling point on the assumption that the changing direction of the edge of sampling point 351 is matched with the changing direction of the edge of the corresponding point to the sampling point.

For example, if an angular difference between the changing direction of the edge of sampling point 351 and the changing direction of the edge of the corresponding point to sampling point 351 is 25°, a score of 50 is obtained when the user selects the deformation permission level of "high". Accordingly, the score is equal to or greater than threshold Th1. Consequently, it is determined that the changing directions of edges on both points are matched with each other. On the other hand, if the angular difference is 25°, a score of 40 is obtained when the user selects the deformation permission level of "middle". Accordingly, the score is smaller than threshold Th1. Consequently, it is determined that the changing directions of the edges on both points are not matched with each other.

Even if the angular difference is equal, thus, various decision results are obtained depending on data to be used.

Image processing apparatus 100 determines that sampling point 351 and the corresponding point to sampling point 351 are matched with each other when the score based on the angular difference between the changing direction of the edge of sampling point 351 and the changing direction of the edge of the corresponding point to sampling point 351 is equal to or greater than threshold Th1. In other words, in this case, image processing apparatus 100 determines that a model (a model image) and an input image are matched with each other in the vicinity of sampling point 351 (a local segment including a sampling point). Moreover, CPU 110 changes a display mode of an image representing a measurement result depending on whether the changing directions of the edges are matched with each other or not, which will be described below in detail. The decision of matching is associated with the direction.

(II) Matching Degree of Entire Measuring Target

CPU 110 further calculates a matching degree of an entire measuring target by using the score. CPU 110 obtains a score by utilizing data D9 having the deformation permission level selected for each sampling point 351. Moreover, CPU 110 calculates a mean value of the score. If the corresponding point to sampling point 351 does not belong to edge extraction area 521 extracted in input image 510, the score is set to be zero for sampling point 351.

CPU 110 determines that the model is matched with workpiece 2 to be measured if the mean value is equal to or greater than predetermined threshold Th2 (for example, 90). On the other hand, CPU 110 determines that the model is not matched with workpiece 2 to be measured if the mean value is smaller than threshold Th2 (for example, 90). As an example, the following description will be given.

Image processing apparatus 100 uses a mean value of a score as a matching degree of the entire measuring target.

The number of the sampling points is set to be 100 and the number of the corresponding points is set to be 96. Moreover, it is assumed that 60 data have an angular difference which is equal to or greater than 0° and is smaller than 10°, 30 data have an angular difference which is equal to or greater than 10° and is smaller than 20°, and six data have an angular difference which is equal to or greater than 20° and is smaller than 30°. In this case, when the deformation permission level of "high" is selected, a mean value is obtained as (100×60+90×30+50×6+0×(100−96))÷100=90. When the deformation permission level of "middle" is selected, moreover, the mean value is obtained as (100×60+70×30+40×6+0×(100−96))÷100=83.4.

When the deformation permission level of "high" is selected, accordingly, CPU 110 determines that the model is matched with workpiece 2 to be measured. On the other hand, when the deformation permission level of "middle" is selected, CPU 110 determines that the model is not matched with workpiece 2 to be measured.

(c3. Display Processing)

Figure 10A:
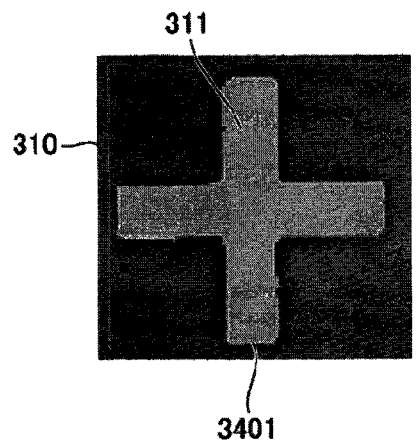
FIGS. 10A and 10B are views for explaining a difference between a model image and an input image.
Figure 10B:
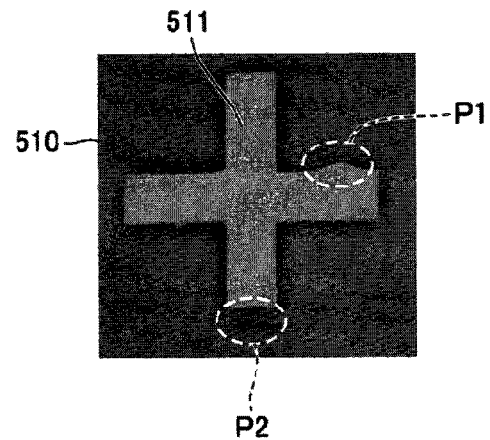

FIGS. 10A and 10B are views for explaining a difference between model image 310 and input image 510. With reference to FIGS. 10A and 10B, image A represents model image 310 obtained by capturing the image of workpiece 2 and edge part 3401 in edge image 340 of FIG. 4. Image B represents input image 510 obtained by capturing the image of workpiece 2 to be measured. As compared with image A, the workpiece is distorted in area P1 of image B. Moreover, a part of the workpiece is missing in area P2.

In this case, an image to be displayed on display 102 by image processing apparatus 100 will be described below. A user interface to be actually displayed on display 102 will be described later (FIGS. 14 to 18).

Figure 11:
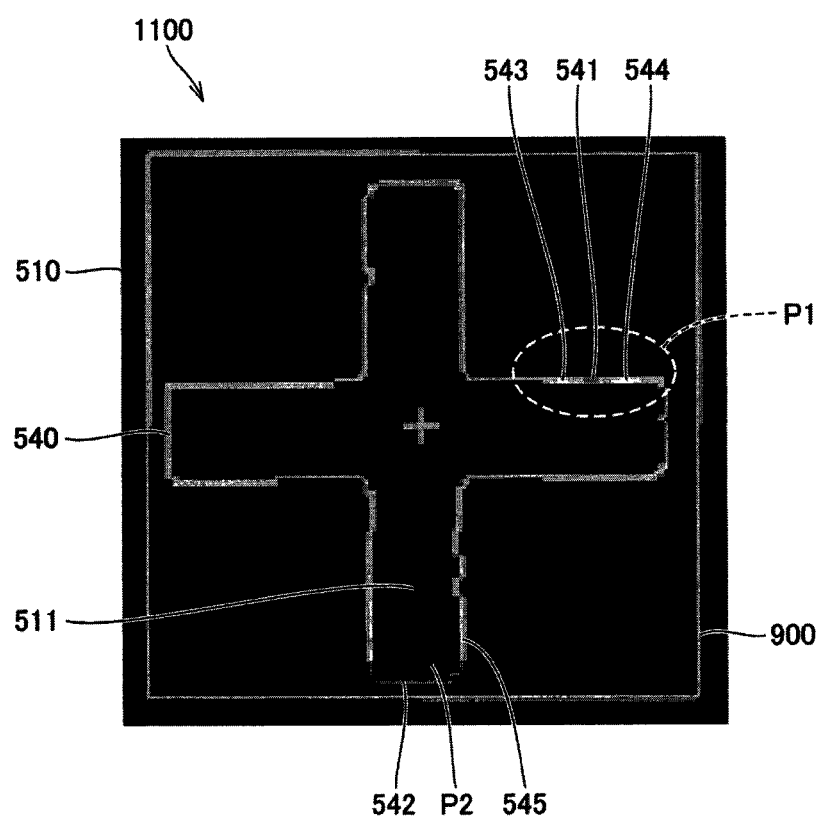
FIG. 11 is a view for explaining a matched portion with a model and a non-matched portion in the input image.

FIG. 11 is a view for explaining matched and non-matched portions with model 350 in input image 510. Specifically, FIG. 11 illustrates an image in the case in which the deformation permission level of "low" described with reference to FIG. 9 is selected by a user.

With reference to FIG. 11, image processing apparatus 100 displays, on display 102, image 1100 in which line image 540 constituted by a segment connecting adjacent corresponding points is superposed on input image 510 including image 511 corresponding to workpiece 2. Image processing apparatus 100 displays, on display 102, a matched portion with model 350 and a non-matched portion with model 350 in different modes from each other when displaying line image 540. More accurately, image processing apparatus 100 displays, on display 102, a segment connecting matched corresponding points (adjacent corresponding points) with sampling point 351 and a segment connecting non-matched corresponding points (adjacent corresponding points) with sampling point 351 in different modes from each other when displaying line image 540.

Referring to the non-matched portions with model 350, image processing apparatus 100 displays, on display 102, a portion which does not belong to an edge area (that is, a segment connecting corresponding points which do not belong to the edge area) and a portion which belongs to the edge area (that is, a segment connecting corresponding points which belong to the edge area) in further different modes from each other.

As an example, image processing apparatus 100 displays, on display 102, a matched portion with model 350 in line image 540 and non-matched portions 541 to 545 with model 350 in different colors from each other. Referring to non-matched portions 541 to 545 with model 350, image processing apparatus 100 displays, on display 102, portions 541 and 542 in which the corresponding points do not belong to the edge area and portions 543, 544 and 545 in which the corresponding points belong to the edge area in further different colors from each other.

A specific example will be taken. Image processing apparatus 100 displays the matched portion with model 350 in a first color (for example, a green color), displays portions 541 and 542 in which the corresponding points do not belong to the edge area in a second color (for example, a red color), and displays portions 543, 544 and 545 in which the corresponding points belong to the edge area in a third color (for example, an yellow color). Frame 900 is a line representing an area to be a measuring target.

Figure 12:
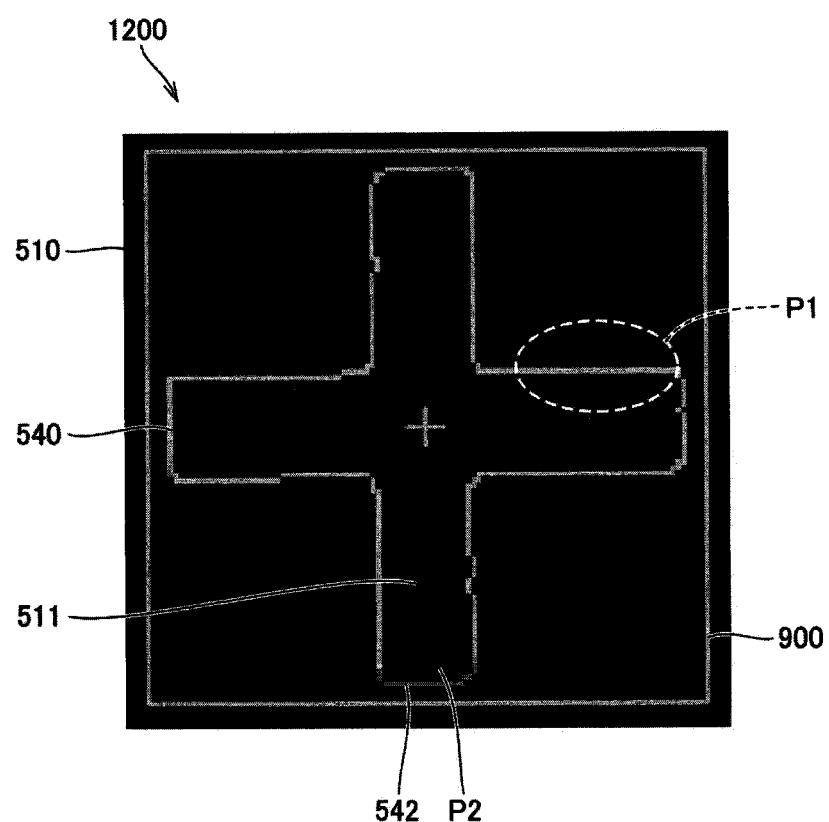
FIG. 12 is a view for explaining the matched portion with the model and the non-matched portion in the input image.

FIG. 12 is a view for explaining the matched and non-matched portions with model 350 in input image 510. Specifically, FIG. 12 illustrates an image in the case in which the deformation permission level of "high" described with reference to FIG. 9 is selected by a user.

With reference to FIG. 12, image processing apparatus 100 displays, on display 102, image 1200 in which line image 540 is superposed on input image 510 including image 511 corresponding to workpiece 2. In that case, image processing apparatus 100 displays, on display 102, a matched portion with model 350 and a non-matched portion with model 350 in input image 510 in different modes from each other as described with reference to FIG. 11. Referring to the non-matched portion with model 350, image processing apparatus 100 displays, on display 102, a portion in which a corresponding point does not belong to an edge area and a portion in which a corresponding point belongs to an edge area in further different modes from each other.

As an example, image processing apparatus 100 displays, on display 102, a matched portion with model 350 in line image 540 and non-matched portion 542 with model 350 in different colors from each other. Referring to the non-matched portion with model 350, image processing apparatus 100 displays, on display 102, portion 542 in which the corresponding point does not belong to the edge area and the portion in which the corresponding point belongs to the edge area in further different colors from each other.

A specific example will be taken. Image processing apparatus 100 displays the matched portion with model 350 in a first color (for example, a green color) and displays portion 542 in which the corresponding point does not belong to the edge area in a second color (for example, a red color). In FIG. 12, the deformation permission level of "high" is selected. Therefore, there is no portion which is not matched with model 350 and has a corresponding point belonging to an edge area. In other words, In FIG. 12, the display in the third color (for example, the yellow color) in FIG. 11 is not performed.

In the case in which the corresponding point to sampling point 351 belongs to the edge area, thus, image processing apparatus 100 changes the display mode of an image representing a measurement result depending on whether the changing direction of the edge on sampling point 351 and that of the edge on the corresponding point are matched with each other. In other words, image processing apparatus 100 displays, in the green color, the portion in which the changing directions of the edges are matched with each other and displays, in the yellow color, the portion in which the edge directions are not matched with each other on a condition that the corresponding point belongs to the edge area. Furthermore, image processing apparatus 100 displays, in the red color, the portion in which the corresponding point does not belong to the edge area.

<D. Functional Structure>

Figure 13:
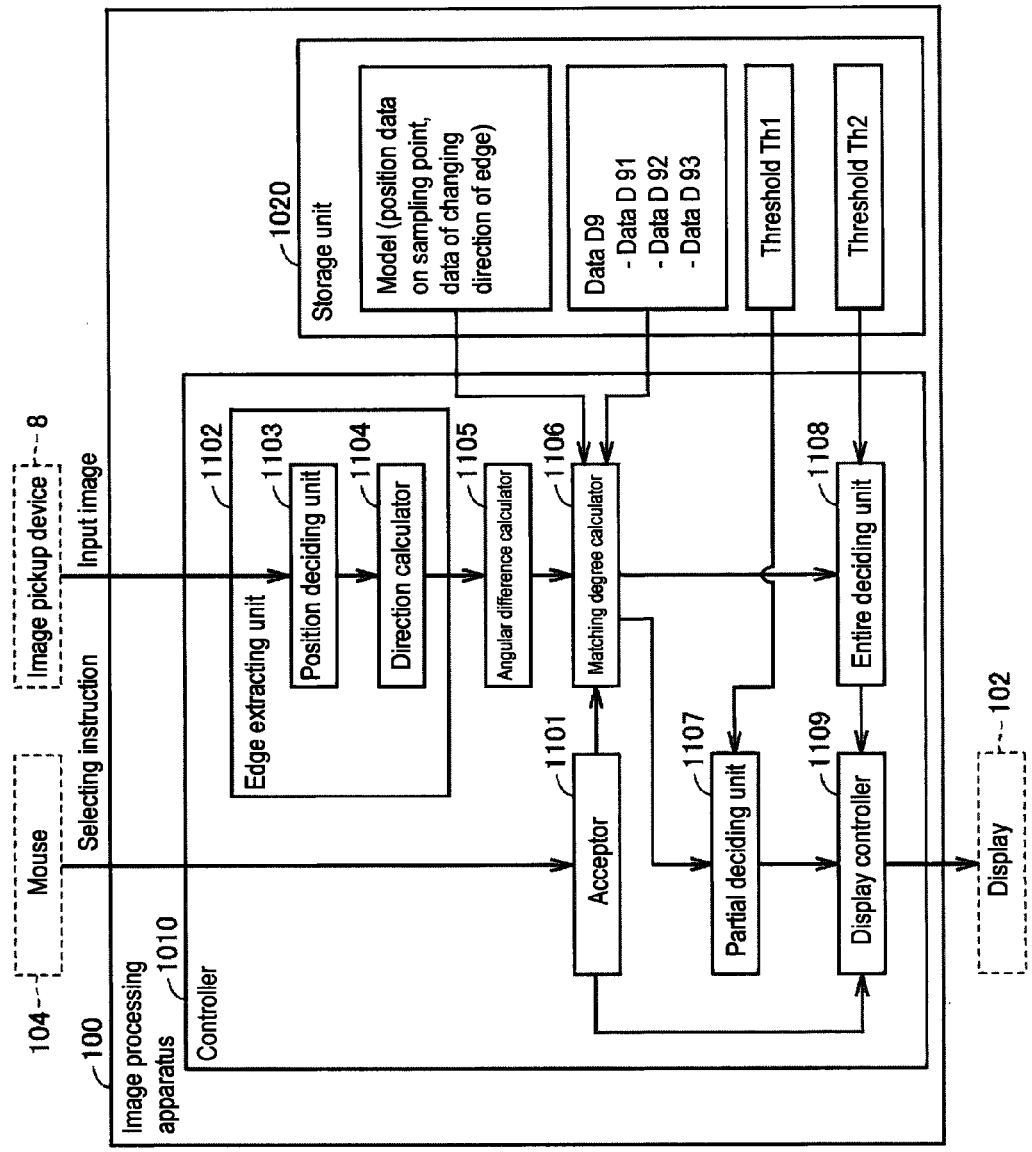
FIG. 13 is a block diagram for explaining a functional structure of the image processing apparatus.

FIG. 13 is a block diagram for explaining the functional structure of image processing apparatus 100. With reference to FIG. 13, image processing apparatus 100 includes controller 1010 and storage unit 1020.

Controller 1010 includes acceptor 1101, angular difference calculator 1105, matching degree calculator 1106, partial determining unit 1107, entire determining unit 1108, and display controller 1109. Edge extracting unit 1102 includes position determining unit 1103 and direction calculator 1104.

Storage unit 1020 prestores a model, data D9, threshold Th1 and threshold Th2.

Acceptor 1101 accepts an instruction associated with a permissible value in a changing direction of an edge. Acceptor 1101 typically accepts a command for selecting one of three deformation permission levels through an input device such as mouse 104. In other words, there is accepted an instruction for designating any of data D91, data D92 and data D93.

Furthermore, acceptor 1101 accepts, from a user, an instruction for selecting a user interface to be displayed on display 102. The instruction is sent to display controller 1109.

Edge extracting unit 1102 extracts an edge of input image 510. More specifically, there is extracted an edge of image 511 corresponding to workpiece 2 which is included in input image 510. As part of the extraction of the edge, moreover, position determining unit 1103 determines, every sampling point 351, whether the corresponding point to sampling point 351 belongs to the extracted edge area or not, and direction calculator 1104 calculates a changing direction of an edge on the corresponding point.

Angular difference calculator 1105 calculates, every corresponding point, an angular difference between a changing direction of an edge on sampling point 351 and a changing direction of an edge on a corresponding point to sampling point 351.

Matching degree calculator 1106 calculates a matching degree (a partial matching degree) of sampling point 351 with the corresponding point to sampling point 351 based on selected data (for example, data D91), the changing direction of the edge on sampling point 351 and the changing direction of the edge on the corresponding point to sampling point 351. Specifically, matching degree calculator 1106 calculates a score indicative of the matching degree of sampling point 351 with the corresponding point to sampling point 351 based on the selected data (for example, data D91) and the calculated angular difference. Matching degree calculator 1106 transmits the calculated score to partial determining unit 1107 and entire determining unit 1108.

Partial determining unit 1107 determines whether sampling point 351 is matched with the corresponding point or not based on the matching degree of sampling point 351 and the corresponding point to sampling point 351. In detail, partial determining unit 1107 determines whether sampling point 351 is matched with the corresponding point to sampling point 351 or not based on the calculated score (matching degree) on a plurality of corresponding points and threshold Th1. In more detail, partial determining unit 1107 determines whether sampling point 351 in which the corresponding point belongs to an edge area of input image 510 is matched with the corresponding point to sampling point 351 or not.

If the calculated score is equal to or greater than threshold Th1, specifically, partial determining unit 1107 determines that sampling point 351 is matched with the corresponding point to sampling point 351. If the calculated score is smaller than threshold Th1, moreover, partial determining unit 1107 determines that sampling point 351 is not matched with the corresponding point to sampling point 351.

Whole determining unit 1108 determines whether a specific area in input image 510 (that is, a partial area to be a target of the pattern matching in input image 510 (typically an extracted rectangular area)) is matched with model 350 or not based on the calculated score on the corresponding points. Specifically, determining unit 1108 determines whether the specific area in input image 510 is matched with model 350 or not based on the matching degree calculated on the corresponding points and threshold Th2. More specifically, entire determining unit 1108 determines whether input image 510 is matched with model 350 or not based on a mean value of the calculated scores on the corresponding points (a matching degree of the entire measuring target) and threshold Th2. In other words, entire determining unit 1108 determines quality of workpiece 2 to be measured. Since the quality determining technique is described above, repetitive explanation will not be given.

Display controller 1109 displays, on display 102, any of the corresponding points which is matched with sampling point 351 (hereinafter referred to as a "matched point") and any of the corresponding points which is not matched with sampling point 351 (hereinafter referred to as a "non-matched point) in different display modes from each other corresponding to input image 510. For example, display controller 1109 displays the non-matched point and the matched point in different colors from each other over display 102. The non-matched point includes the corresponding point which is not determined to belong to the edge area and the corresponding point which is determined to belong to the edge area and has the smaller calculated score than threshold Th1. In more detail, display controller 1109 displays, on display 102, any of the corresponding points determined to belong to the edge area which is matched with sampling point 351 and any of the corresponding points which is not matched with sampling point 351 in different display modes from each other corresponding to input image 510.

Moreover, display controller 1109 displays the corresponding point on display 102 in order to take different display modes in the case in which it belongs to the edge area of input image 510 and in the case in which it does not belong to the edge area. For example, display controller 1109 displays, on display 102, the corresponding point which belongs to the edge area and the corresponding point which does not belong to the edge area in different colors from each other.

In other words, display controller 1109 displays, on display 102, (i) a matched point in the corresponding points (any of the corresponding points which belongs to the edge area of input image 510 and where the changing directions of the edges are matched (the score is equal to or greater than threshold Th1)), (ii) any of the corresponding points in non-matched points which does not belong to the edge area of input image 510, and (iii) any of the corresponding points in the non-matched points which belongs to the edge area of input image 510 and where the changing directions of the edges are not matched (the score is smaller than threshold Th1) in different display modes from each other (for example, different colors from each other).

Furthermore, display controller 1109 displays line image 540 constituted by a segment connecting adjacent corresponding points to each other in a state in which input image 510 is displayed as shown in FIGS. 11 and 12.

Thus, display controller 1109 sets the display mode in the vicinity of the corresponding point to be a display mode depending on the display mode of the corresponding point. For example, display controller 1109 displays the matched point and the vicinity thereof in the first color (for example, the green color) over display 102. Moreover, display controller 1109 displays, in the second color (for example, the red color), any corresponding point in the non-matched points which does not belong to the edge area of input image 510 and the vicinity of the corresponding point. Furthermore, display controller 1109 displays any of the corresponding points in the non-matched points which belongs to the edge area of input image 510 and where the changing directions of the edges are not matched and the vicinity of the corresponding point in the third color (for example, the yellow color).

In addition, display controller 1109 displays, on display 102, various information such as a quality decision result obtained by entire determining unit 1108 (FIGS. 14 to 18).

<E. User Interface>

A user interface to be displayed on display 102 by image processing apparatus 100 will be described with reference to FIGS. 14 to 18.

(e1. Setting Mode)

Figure 14:
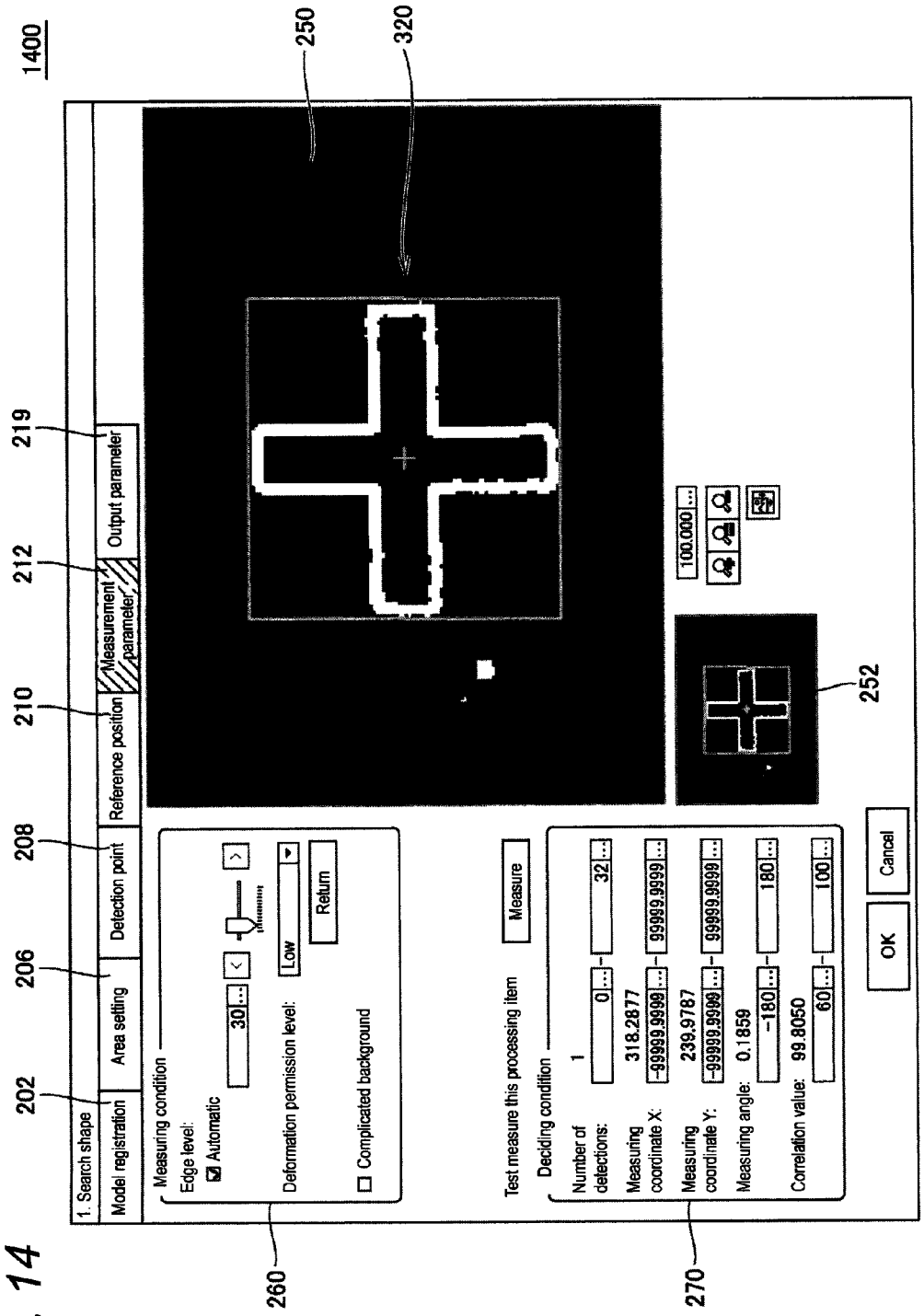
FIG. 14 is a view showing an example of a user interface screen provided in a setting mode by the image processing apparatus.

FIG. 14 is a view showing an example of a user interface screen to be offered in a setting mode by image processing apparatus 100. FIG. 14 shows user interface screen 1400 in the case in which a user sets various set values (measuring conditions) which are necessary for pattern matching.

User interface screen 1400 shown in FIG. 14 selectably displays model registration tab 202, area setting tab 206, detection point tab 208, reference setting tab 210, measurement parameter tab 212 and output parameter tab 214. User interface screen 1400 shown in FIG. 14 illustrates a state in which measurement parameter tab 212 is selected. Moreover, user interface screen 1400 includes measuring condition setting area 260, determining condition setting area 270, image display area 250 and entire display area 252.

Measuring condition setting area 260 includes an edge level (edge intensity) setting box for carrying out edge extraction processing and a setting box for setting a deformation permission level. By change in the edge level, an edge area is varied. When the edge level is increased, specifically, an edge width in edge extraction image 320 is reduced. When the edge level is reduced, the edge width in edge extraction image 320 is increased. The rise in the edge level implies that a threshold of the edge intensity is increased.

When the user changes the deformation permission level, any of data D91, D92 and D93 included in data D9 shown in FIG. 9 is determined to be utilized. For example, if the deformation permission level of "low" is selected, data D93 is utilized.

Deciding condition setting area 270 accepts a determining condition for setting any of measurement results which is obtained by the pattern matching according to the present embodiment and is effective.

In other words, a numerical range (a coordinate range) to be input to a numerical input box of a measuring coordinate X is used as a determining condition for an x component of the measuring coordinate. Moreover, a numerical range (a coordinate range) to be input to a numerical input box of a measuring coordinate Y is used as a determining condition for a y component of the measuring coordinate. Moreover, a numerical range (an angle range) to be input to a numerical input box of a measuring angle is used as a determining condition for an angle component of a measurement result.

Furthermore, a numerical range to be input to a numerical input box of a correlation value is used as a determining condition for a correlation value in each measuring coordinate. In addition, a numerical range to be input to a numerical input box of the number of detections is used as a maximum detection number condition to be output by one-time execution of the pattern matching.

In user interface screen 1400 shown in FIG. 14, edge extraction image 320 is displayed on image display area 250. An image to be displayed on image display area 250 is not restricted to edge extraction image 320. Moreover, an entire image which can be displayed on image display area 250 is displayed on entire display area 252.

(e2. Measuring Mode)

(I) User Interface with Deformation Permission Level of "Low"

Figure 15:
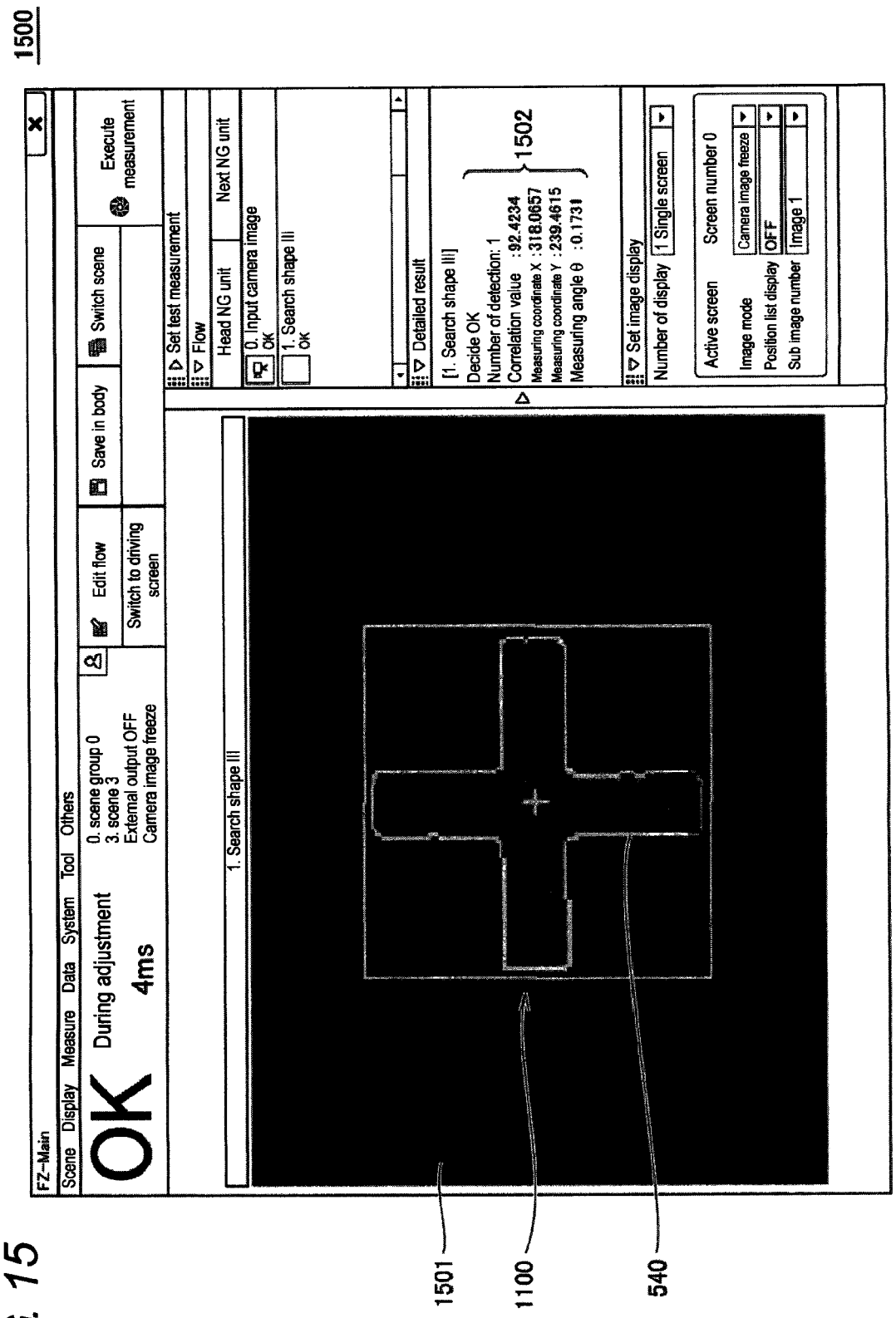
FIG. 15 is a view showing an example of a user interface screen provided in a measuring mode by the image processing apparatus.

FIG. 15 is a view showing an example of a user interface screen to be offered in a measuring mode by image processing apparatus 100. Specifically, FIG. 15 is a view illustrating user interface screen 1500 in the case in which the deformation permission level is set to be "low".

With reference to FIG. 15, user interface screen 1500 displays a measurement result obtained by carrying out the pattern matching as described above over image data to be generated in the case in which a plurality of workpieces is present in the visual field of image capturing device 8.

When the pattern matching based on a previously registered model is performed over an input image, image processing apparatus 100 displays image 1100 of FIG. 11 on image display area 1501. Moreover, image processing apparatus 100 displays a numeric value indicative of the measurement result on display 102 (reference numeral 1502). Furthermore, image processing apparatus 100 also displays, on an area in an upper right part of the screen, a quality decision result (display of OK or NG) of workpiece 2 based on the measurement result. In the example of FIG. 15, the correlation value is equal to or greater than threshold Th2 (=90). Therefore, "OK" is displayed.

Figure 16:
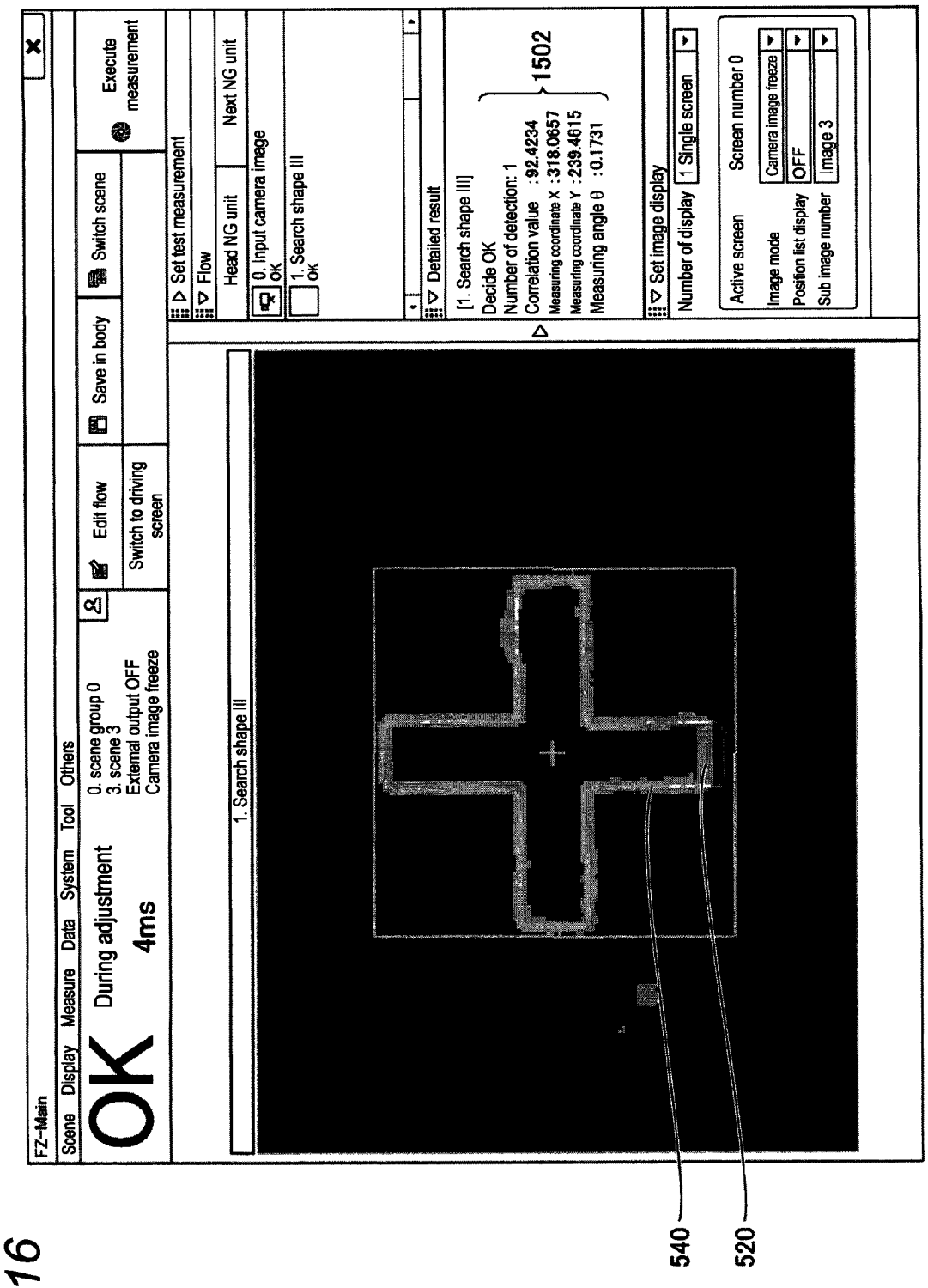
FIG. 16 is a view showing an example of a user interface screen obtained after a transition from FIG. 15.

FIG. 16 is a view showing an example of the user interface screen after a transition from FIG. 15. Specifically, FIG. 16 illustrates user interface screen 1600 after selection of "image 3" in a sub image number on a lower right part of the screen based on a user's manipulation in the state of FIG. 15.

When image 3 is selected, image processing apparatus 100 displays, on display 102, user interface screen 1600 in which edge extraction image 520 (image B in FIG. 6) of workpiece 2 to be measured is caused to overlap with image 1100.

(II) User Interface with Deformation Permission Level of "High"

Figure 17:
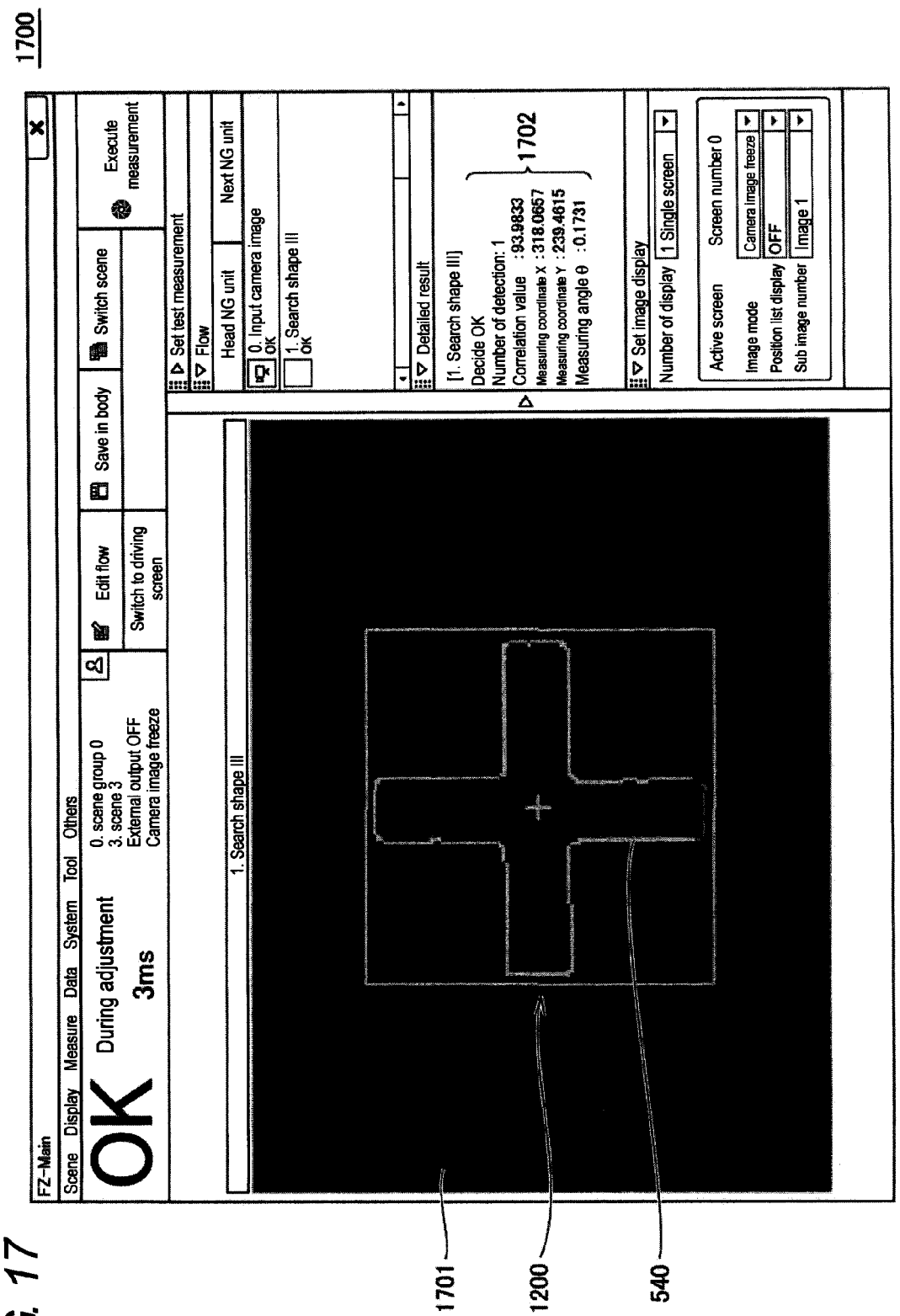
FIG. 17 is a view showing another example of the user interface screen provided in the measuring mode by the image processing apparatus.

FIG. 17 is a view showing another example of a user interface screen to be offered in the measuring mode by image processing apparatus 100. Specifically, FIG. 17 is a view illustrating user interface screen 1700 in the case in which the deformation permission level is set to be "high".

With reference to FIG. 17, user interface screen 1700 displays the measurement result obtained by carrying out the pattern matching over image data to be generated in the case in which a plurality of workpieces is present in the visual field of image capturing device 8 in the same manner as user interface screen 1500 in FIG. 15.

When the pattern matching based on a previously registered model is performed over an input image, image processing apparatus 100 displays image 1200 of FIG. 12 on image display area 1701. Moreover, image processing apparatus 100 displays a numeric value indicative of the measurement result on display 102 (reference numeral 1702). Furthermore, image processing apparatus 100 also displays, on an area in an upper right part of the screen, a quality decision result (display of OK or NG) of workpiece 2 based on the measurement result. In the example of FIG. 17, the correlation value is equal to or greater than threshold Th2 (=90). Therefore, "OK" is displayed.

Figure 18:
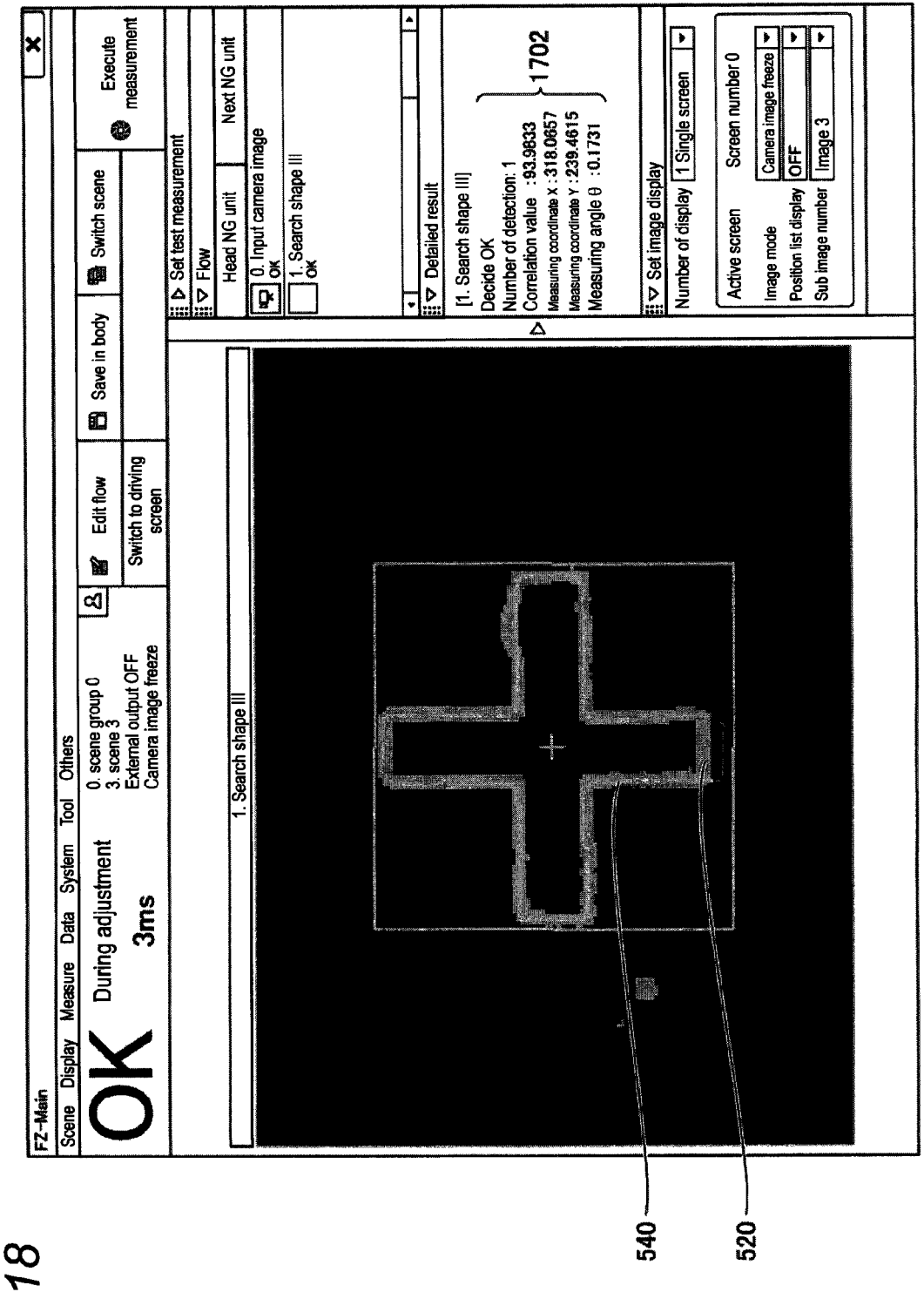
FIG. 18 is a view showing an example of a user interface screen obtained after a transition from FIG. 17.

FIG. 18 is a view showing an example of the user interface screen after a transition from FIG. 17. Specifically, FIG. 18 illustrates the user interface screen after selection of "image 3" in a sub image number on a lower right part of the screen based on a user's manipulation in the state of FIG. 17.

When image 3 is selected, image processing apparatus 100 displays, on display 102, the user interface screen in which edge extraction image 520 of workpiece 2 to be measured is caused to overlap with image 1200.

<F. Advantage>

According to image processing apparatus 100, it is possible to change the matching degree of the model and the entire measuring target without varying the edge level (see FIG. 14) and threshold Th2 for the quality decision of the measuring target (workpiece 2). In other words, the user can change the matching degree (the mean value of the score, the correlation value) of an entire single measuring target by varying the deformation permission level as described above. According to image processing apparatus 100, thus, it is possible to permit the local shape deformation of the target in the pattern matching using the shape feature of the measuring target (workpiece 2).

Moreover, display controller 1109 displays, on display 102, a matching point and the vicinity of the matching point, and a non-matched point and the vicinity of the non-matched point in different display modes (for example, different colors) from each other. Consequently, the user can easily discriminate a non-matched portion of a model and an input image. In detail, the user can readily grasp a defective portion of workpiece 2 to be measured. Referring to the display of the non-matched point, particularly, display controller 1109 displays, on display 102, a corresponding point which does not belong to the edge area of input image 510 and a corresponding point which belongs to the edge area of input image 510 and where the changing directions of the edges are not matched in different display modes (for example, different colors) from each other. Consequently, the user can easily determine why the non-match occurs.

<G. Variant>

Although the description is given by taking the different colors as an example of the different display modes from each other, the present invention is not restricted thereto. For example, image processing apparatus 100 may have such a structure that a matched point and the vicinity of the matched point, and a non-matched point and the vicinity of the non-matched point are displayed in a color of a single type (for example, a green color) and are displayed in line types, line widths, densities or the like which are different from each other. With the structure, referring to the display of the non-matched point, it is preferable to configure image processing apparatus 100 in order to display a corresponding point which does not belong to the edge area of input image 510 and a corresponding point which belongs to the edge area of input image 510 and where the changing directions of the edges are not matched in the line types, line widths, densities or the like which are different from each other.

Moreover, a color density may be varied depending on a score of a corresponding point. Specifically, image processing apparatus 100 may be configured in such a manner that the color density is more increased in a portion having a lower score (a sampling point and a vicinity thereof) in association with a corresponding point which belongs to the edge area of input image 510 and where the changing directions of the edge are not matched and the vicinity of the corresponding point when a matched point and the vicinity of the matched point, and a non-matched point and the vicinity of the non-matched point are to be displayed in different colors from each other.

According to the structure, the user can easily grasp an extent of defined deformation or more in a place of workpiece 2 to be a measuring target where the deformation occurs.

It should be considered that the embodiment disclosed herein is illustrative in all respects and is not restrictive. The scope of the present invention is described in claims in place of the above explanation and it is intended that equivalent meaning to the claims and all changes within the range are included.

What is claimed is:

1. An image processing apparatus configured to search a similar area to a previously registered model from an input image,
the model being defined by a plurality of first positions on an edge extracted from a model image and a changing direction of the edge in each of the first positions,
the image processing apparatus comprising:
a first calculator configured to calculate a changing direction of an edge in a second position of the input image corresponding to the first position;
an acceptor configured to accept an instruction associated with a permissible value of the changing direction of the edge;
a second calculator configured to calculate a similarity degree of the first position and the second position corresponding to the first position, based on the accepted instruction and the changing direction of the edge in the first position and the changing direction of the edge in the second position; and
a first determining unit configured to determine whether a specific area in the input image is similar to the model or not based on the similarity degree calculated between the first position and the second position corresponding to the first position.

2. The image processing apparatus according to claim 1, wherein the acceptor accepts, as the instruction, an instruction for designating any of data with which information representing a difference between changing directions of two edges and a similarity degree of the two edges are associated.

3. The image processing apparatus according to claim 2 further comprising a storage unit configured to prestore the data.

4. The image processing apparatus according to claim 2, wherein an angular difference between changing directions of two edges and the similarity degree are associated with each of the data in such a manner that a matching degree of the two edges is reduced when the angular difference is increased,
the association of the similarity degree with the angular difference is different between the data from each other,
the image processing apparatus further comprising a third calculator configured to calculate, every second position, an angular difference between a changing direction of an edge in the first position and a changing direction of an edge in the second position corresponding to the first position, and
the second calculator calculating the similarity degree of the first position and the second position corresponding to the first position based on the designated data and the calculated angular difference.

5. The image processing apparatus according to claim 4, further comprising:
a second determining unit configured to determine, every first position, whether the second position corresponding to the first position belongs to the edge area of the input image or not,
the first calculator calculating a changing direction of an edge in the second position corresponding to the first position when the second determining unit determines that the second position belongs to the edge area.

6. The image processing apparatus according to claim 1, further comprising:
a third determining unit configured to determine whether the first position and the second position are similar to each other or not based on the similarity degree of the first position and the second position corresponding to the first position; and
a display controller configured to display, on a display, the second position which is similar to the first position and the second position which is not similar to the first position in different display modes from each other corresponding to the input image.

7. The image processing apparatus according to claim 1, further comprising:
a second determining unit configured to determine, every first position, whether the second position corresponding to the first position belongs to the edge area of the input image or not; and
a display controller configured to display, on a display, the second position which belongs to the edge area of the input image and the second position which does not belong to the edge area of the input image in different display modes from each other corresponding to the input image.

8. The image processing apparatus according to claim 6, wherein the display mode is a color.

9. The image processing apparatus according to claim 1, wherein the first position is obtained by sampling a point on an edge of the model image.

10. An image processing method of searching a similar area to a previously registered model from an input image,
the model being defined by a plurality of first positions on an edge extracted from a model image and a changing direction of the edge in each of the first positions,
the image processing method comprising the steps of:
calculating a changing direction of an edge in a second position of the input image corresponding to the first position;
accepting an instruction associated with a permissible value of the changing direction of the edge;
calculating a similarity degree of the first position and the second position corresponding to the first position, based on the accepted instruction and the changing direction of the edge in the first position and the changing direction of the edge in the second position; and
determining whether a specific area in the input image is similar to the model or not based on the similarity degree calculated between the first position and the second position corresponding to the first position.

11. A non-transitory computer readable storage medium storing a program for controlling an image processing apparatus configured to search a similar area to a previously registered model from an input image,
the model being defined by a plurality of first positions on an edge extracted from a model image and a changing direction of the edge in each of the first positions,
the program causing a processor of the image processing apparatus to execute the steps of:
calculating a changing direction of an edge in a second position of the input image corresponding to the first position;
accepting an instruction associated with a permissible value of the changing direction of the edge;
calculating a similarity degree of the first position and the second position corresponding to the first position, based on the accepted instruction and the changing direction of the edge in the first position and the changing direction of the edge in the second position; and
determining whether a specific area in the input image is similar to the model or not based on the similarity degree calculated between the first position and the second position corresponding to the first position.

* * * * *